(12) United States Patent
Reinhart

(10) Patent No.: US 7,712,438 B2
(45) Date of Patent: May 11, 2010

(54) METHOD AND APPARATUS FOR ADJUSTING THE CORRECTION LEVEL OF AN ANIMAL TRAINING RECEIVER

(75) Inventor: Anthony J. Reinhart, Ft Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 700 days.

(21) Appl. No.: 11/614,174

(22) Filed: Dec. 21, 2006

(65) Prior Publication Data

US 2007/0221141 A1 Sep. 27, 2007

Related U.S. Application Data

(63) Continuation-in-part of application No. 11/389,003, filed on Mar. 24, 2006, now Pat. No. 7,559,291.

(51) Int. Cl.
*A01K 15/02* (2006.01)
(52) U.S. Cl. ...................... 119/859; 119/908
(58) Field of Classification Search ................. 119/859, 119/718, 719, 720, 908; 340/573.2, 573.3, 340/573.4
See application file for complete search history.

(56) References Cited

U.S. PATENT DOCUMENTS

| | | | | |
|---|---|---|---|---|
| 2,023,950 A | 10/1935 | Carter | ...................... | 175/311 |
| 3,687,112 A | 8/1972 | Henderson | .................... | 119/29 |
| 4,202,293 A | 5/1980 | Gonda et al. | .................. | 119/29 |
| 4,335,682 A | 6/1982 | Gonda et al. | .................. | 119/29 |
| 4,802,482 A | 2/1989 | Gonda et al. | .................. | 119/29 |
| 4,967,695 A | 11/1990 | Giunta | ......................... | 119/29 |
| 5,054,428 A | 10/1991 | Farkus | ......................... | 119/29 |
| D330,173 S | 10/1992 | Juliana et al. | ............... | D10/106 |
| 5,161,485 A | 11/1992 | McDade | ..................... | 119/106 |
| 5,353,744 A | 10/1994 | Custer | ......................... | 119/719 |
| 5,465,687 A | 11/1995 | Custer | ......................... | 119/719 |
| 5,471,954 A | 12/1995 | Gonda et al. | ................ | 119/859 |
| 5,640,932 A * | 6/1997 | Bianco et al. | ............... | 119/720 |
| 5,934,225 A | 8/1999 | Williams | ..................... | 119/859 |
| 6,003,474 A * | 12/1999 | Slater et al. | ................ | 119/859 |
| 6,019,066 A | 2/2000 | Taylor | ......................... | 119/720 |
| 6,079,367 A | 6/2000 | Stapelfeld et al. | ........... | 119/720 |
| 6,166,643 A | 12/2000 | Janning et al. | ........... | 340/573.3 |
| 6,230,661 B1 | 5/2001 | Yarnall, Jr. et al. | .......... | 119/721 |
| 6,273,027 B1 * | 8/2001 | Watson et al. | ............... | 119/712 |
| 6,474,269 B2 | 11/2002 | So | .............................. | 119/720 |
| 6,598,563 B2 | 7/2003 | Kim et al. | .................... | 119/720 |
| 6,712,025 B2 | 3/2004 | Peterson et al. | ............. | 119/721 |
| 6,907,844 B1 | 6/2005 | Crist et al. | ................... | 119/718 |
| 6,928,958 B2 | 8/2005 | Crist et al. | ................... | 119/718 |
| 7,000,570 B2 | 2/2006 | Napolez et al. | ............. | 119/718 |
| 2005/0145200 A1 | 7/2005 | Napolez et al. | ............. | 119/718 |

* cited by examiner

*Primary Examiner*—Yvonne R. Abbott
(74) *Attorney, Agent, or Firm*—Pitts & Brittian, P.C.

(57) ABSTRACT

An animal behavior modification kit including a collar mountable receiver and a plurality of circuit boards. The collar mountable receiver has a first electrode terminal and a second electrode terminal. Each of the plurality of circuit boards are selectively mechanically connectable to both the first electrode terminal and the second electrode terminal. The plurality of circuit boards include at least one electrical component having an electrical characteristic. The electrical characteristic of each of the plurality of circuit boards being different.

13 Claims, 8 Drawing Sheets

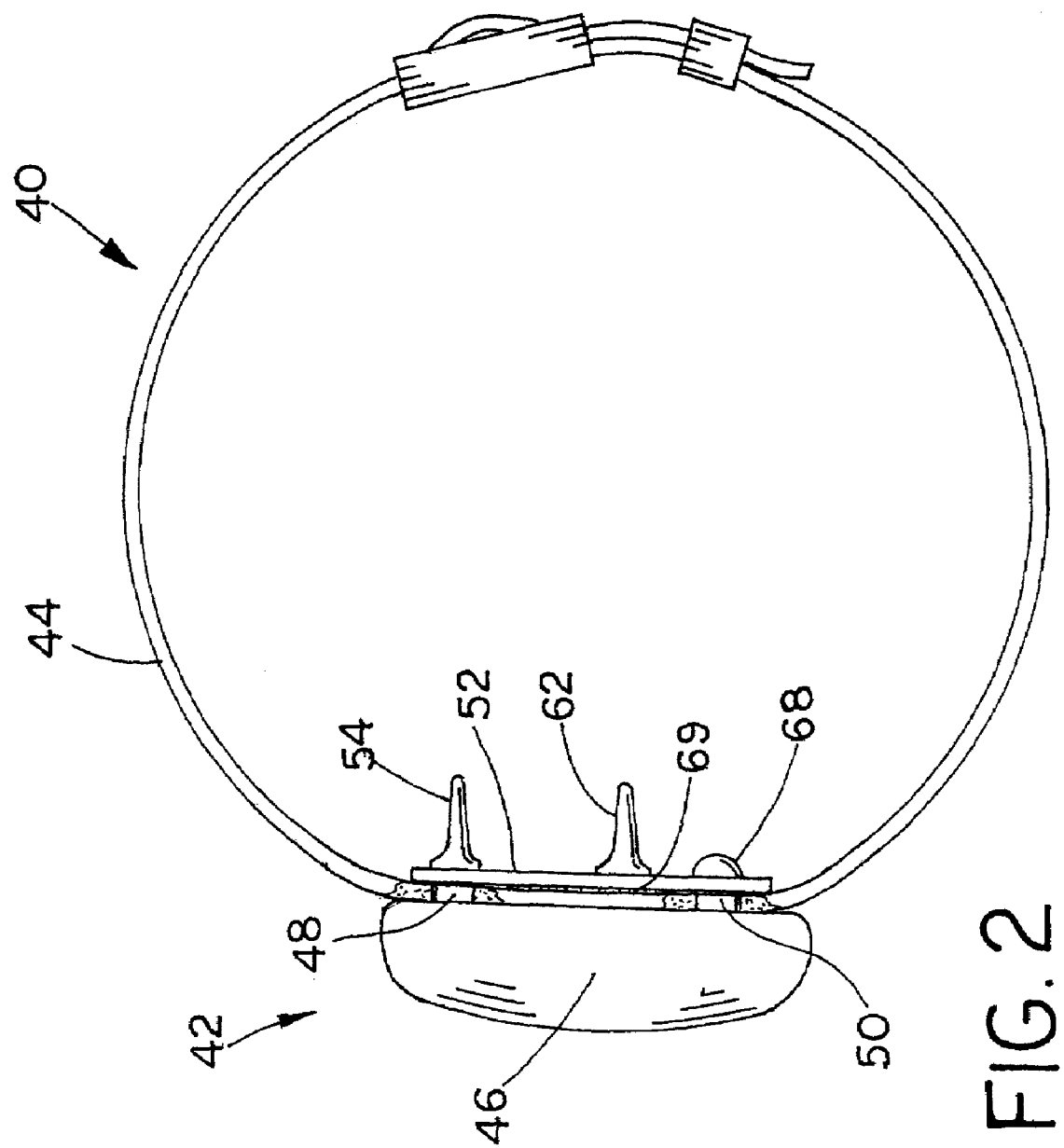

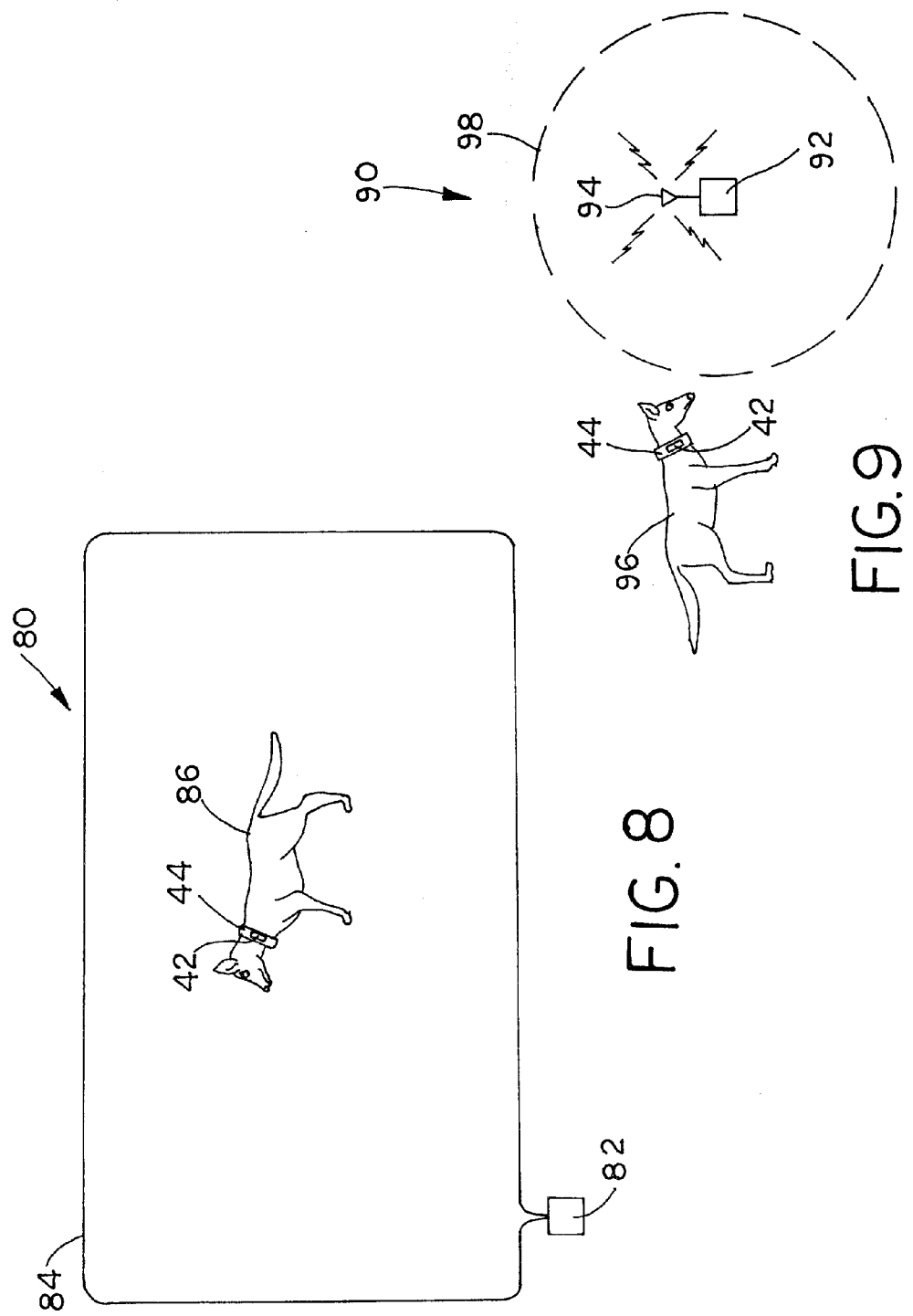

METHOD AND APPARATUS FOR ADJUSTING THE CORRECTION LEVEL OF AN ANIMAL TRAINING RECEIVER

CROSS REFERENCE TO RELATED APPLICATIONS

This is a continuation-in-part of U.S. patent application Ser. No. 11/389,003, entitled "METHOD AND APPARATUS FOR ADJUSTING THE CORRECTION LEVEL OF AN ANIMAL TRAINING RECEIVER", filed Mar. 24, 2006 now U.S. Pat. No. 7,559,291.

BACKGROUND OF THE INVENTION

1. Field of the Invention

The present invention relates to animal training systems, and, more particularly, to a method and apparatus for adjusting the correction level or range of correction levels of an animal training receiver.

2. Description of the Related Art

Stimulus collars for animal training, particularly dog training, are known which can provide a variety of stimuli to the animal to encourage a trained response by the animal, and/or to discourage an inappropriate response. Such stimuli can include electrical, sound and vibrational stimuli, for example. In the case of an electrical stimulus, a collar worn receiver typically includes a pair of electrodes, which can deliver the electrical stimulus to a dog's neck. The receiver energizes the electrodes responsive to a transmitter. Examples of such a transmitter can include a remote training transmitter hand operated by a human trainer, a containment transmitter and an avoidance transmitter. For a bark control collar, a collar worn receiver may receive audio or vibration signals from a microphone or transducer attached or connected to the receiver unit or the collar.

When activated by an appropriate signal from a corresponding transmitter or transducer, electrical stimulation is provided to a dog, for example, through the collar worn receiver electrodes which are in contact with some part of the dog's neck. In order to accommodate differences between breeds, individual dog temperament, training conditions, etc., it is advantageous to provide a wide range of possible stimulation, which range is selectable at the transmitter by the trainer. For example, the general difference in coat/skin of one breed versus another breed may provide a general difference in contact resistance, which can generally make a given breed more correctable at a lower electrical stimulation than another breed which has a thicker coat with a downy underlayer, for example. Further, a relatively strong willed dog may require more stimulation for a given training condition than a more amenable dog. Although the proper use of such electronic collars is a very effective, efficient, and humane way to train or control dogs (or other animals such as monkeys and horses) for a variety of purposes, such as general obedience, performance trials, hunting, herding, and police work, to be most effective and humane, it is important that electronic stimulus collars are able to reliably and consistently apply the intended degree of stimulus to the skins of a wide variety of dogs under a wide variety of conditions.

For example, training conditions can play a large role in determining the amount of stimulation necessary for a given dog. Skin and fur conditions can range from very dry and nearly electrically nonconductive to very wet and highly conductive. The fur of a dog running through wet cover conditions or jumping into a pond or creek, for example, during retrieval training or bird hunting, may be nearly electrically nonconductive during the early part of a training procedure or hunt and very wet and conductive during a later part thereof. Consequently, a low shock level in such a situation may be transformed, because of the skin and fur conditions brought on by the training circumstance, to a relatively high and perhaps unacceptable or inappropriate stimulus level.

Failure to deliver an appropriate stimulus at precisely the correct time in a dog training situation can result in a confused, poorly trained animal, and may also reverse previous training accomplishments. Consequently, the reliability of providing an intended electrical stimulus level to the skin of the dog under a wide variety of conditions (eg., of collar tightness, thickness and wetness of fur, general sensitivity of the particular dog to electrical stimulus, and the presence of distracting influences or occurrences) is quite critical to the overall effectiveness of electronic stimulus collars and the associated training techniques.

The receivers of modern electronic collars quite often can be programmed to deliver one of several levels of stimulation for a given collar receiver input, or in the case of remote training systems, one of several levels of stimulation may be selectable by the human trainer using pushbuttons, or other command input devices. For a particular dog on which an electronic stimulus collar is being used for the first time, the lowest level stimulation signal may be applied to the neck of the dog. If the dog does not appear to have noticed the stimulation (for example, the dog does not change head position or ear posture, cock its head, or exhibit an involuntary muscle twitch), a higher stimulation level can be selected until a threshold stimulus level is established for that dog, as evidenced by one of the above reactions. Stimulus intensity thereafter is varied in noticeable increments by depressing the various intensity controls on the remote transmitter or by reprogramming the receiver collar as required by the particular training circumstance. However, such electronic collars are limited to a discrete number of stimulation levels which, given a particular dog, training objective and training conditions, may not provide an adequate selectable range of stimulation.

The electrodes of an electronic collar are typically connected to the secondary winding of a transformer within the collar's receiver, and the electrodes and the animal's contact resistance between the electrodes represents a load to the transformer. When the primary winding of the transformer is appropriately energized, the secondary winding provides an electrical stimulation to the load, i.e., the animal. A greater electrical load resistance effectively reduces the electrical stimulation, so that one way of changing stimulation levels is to change the load resistance, as opposed to changing the characteristics of the electrical energy provided to the primary winding.

A resistive electrode structure for an electronic stimulus collar is known which includes a base attached to a connecting element of the electronic stimulus collar. An electrode of the resistive electrode structure includes a tip adapted to supply electrical stimulus to the skin of an animal. A resistive material is electrically connected between a conductor for electrical connection to an output of the electronic stimulus collar and the electrode. This resistance effectively increases the load resistance presented to the secondary winding and accordingly modifies the stimulation level delivered to the animal for a given electrical input to the transformer primary winding. Various such resistive electrode structures which have various resistances can be interchangeably connected to the electronic stimulus collar to vary the level of stimulus applied to the skin of the animal. Therefore, if the electronic stimulus collar inherently has three selectable or programmable stimulation levels, and if there are five different resistive electrode structures available each with a different electrical resistance, the number of electrical stimulation levels has now increased from three to fifteen (three times five), for example.

Problems with such a resistive electrode structures are that the electrodes are relatively difficult and expensive to manufacture, and can be unreliable. Another problem with these resistive electrode structures is that they can be difficult to distinguish from a non-resistive electrode since the resistor is embedded within the electrode. Another problem with these resistive electrode structures is that electrodes in general can be provided in different lengths to accommodate for different fur thicknesses, which multiplies the number of resistive electrodes required. Yet another problem is that a damaged resistor within the electrode, such as an electrical short or open, is not readily apparent, which increases the risk of an inappropriate correction level.

What is needed in the art is a way of increasing the resistance between an electronic collar's output terminals, which does not embed resistive elements into the electrodes.

SUMMARY OF THE INVENTION

The present invention provides a receiver for an animal training collar with a circuit board on the outside of the receiver housing and between the electrodes and the housing, which circuit board includes a resistor electrically connected between one of the receiver electrode terminals and an electrode.

The invention comprises, in one form thereof, an animal behavior modification kit including a collar mountable receiver and a plurality of circuit boards. The collar mountable receiver has a first electrode terminal and a second electrode terminal. Each of the plurality of circuit boards are selectively mechanically connectable to both the first electrode terminal and the second electrode terminal. The plurality of circuit boards include at least one electrical component having an electrical characteristic. The electrical characteristic of each of the plurality of circuit boards being different.

An advantage of the present invention is that it increases the levels of stimulation available to an electronic animal training collar.

Another advantage of the present invention is that it is cost effective to manufacture.

Yet other advantages of the present invention is that it is easy to install and use.

Yet another advantage of the present invention is that it is reliable in service.

Yet another advantage of the present invention is that it does not require a specialized electrode structure, particularly with an internal resistor.

Yet another advantage of the present invention is that it can be used with a variety of animal training systems.

Yet another advantage of the present invention is that it can be used with a variety of receivers which are part of an animal training system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a partially fragmentary top view of an embodiment of an electrical stimulus collar including a receiver according to the present invention;

FIG. 8 is a schematic view of a containment type animal training system according to the present invention;

FIG. 9 is a schematic view of an avoidance type animal training system according to the present invention;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
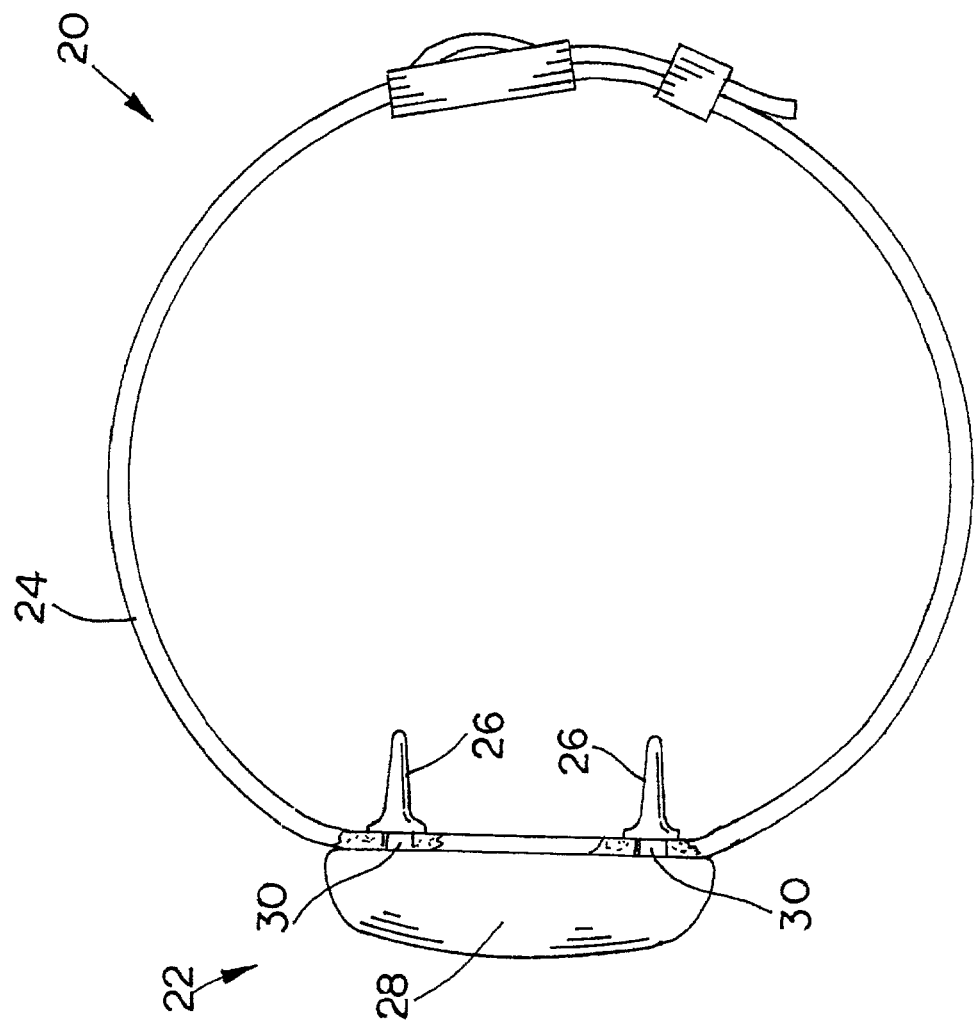
FIG. 1 is a partially fragmentary top view of a prior art electrical stimulus collar.
Figure 4:
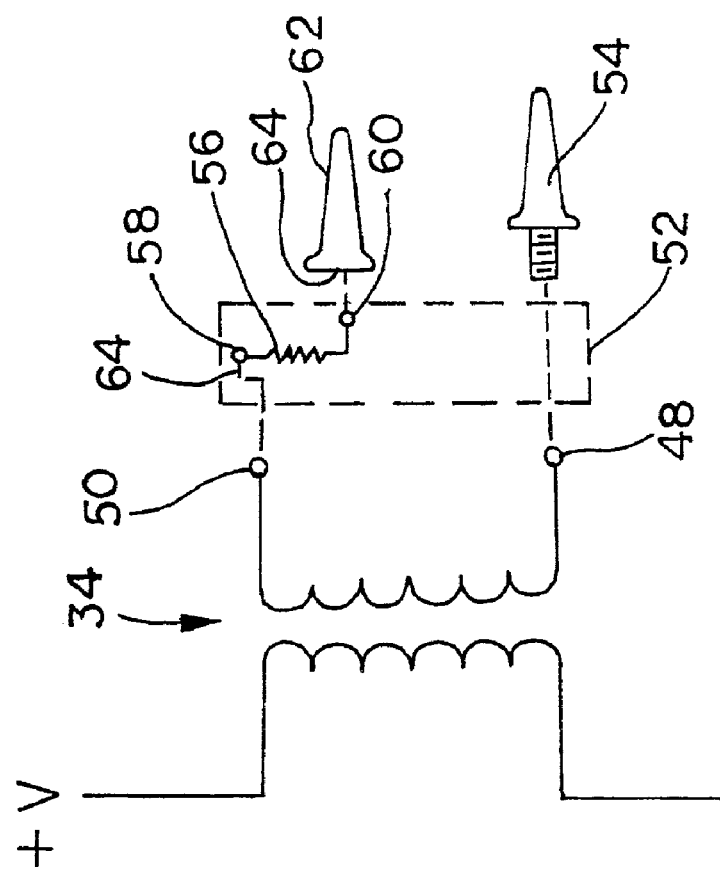
FIG. 4 is an electrical schematic view of the electrical stimulus collar of FIG. 2 according to the present invention.
Figure 3:
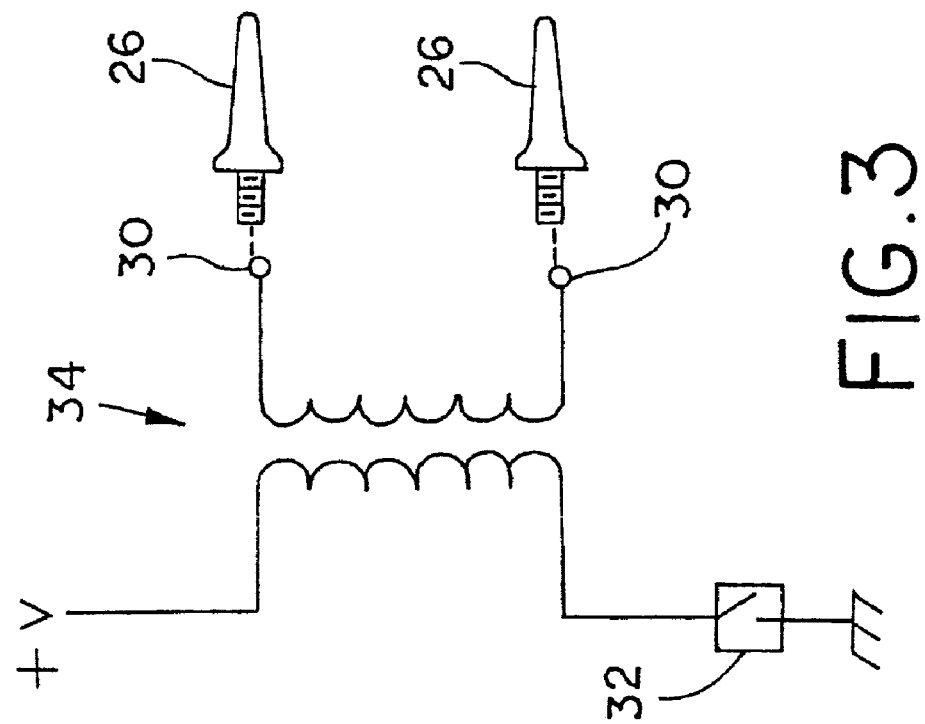
FIG. 3 is an electrical schematic view of the prior art electrical stimulus collar of FIG. 1.
Figure 5:
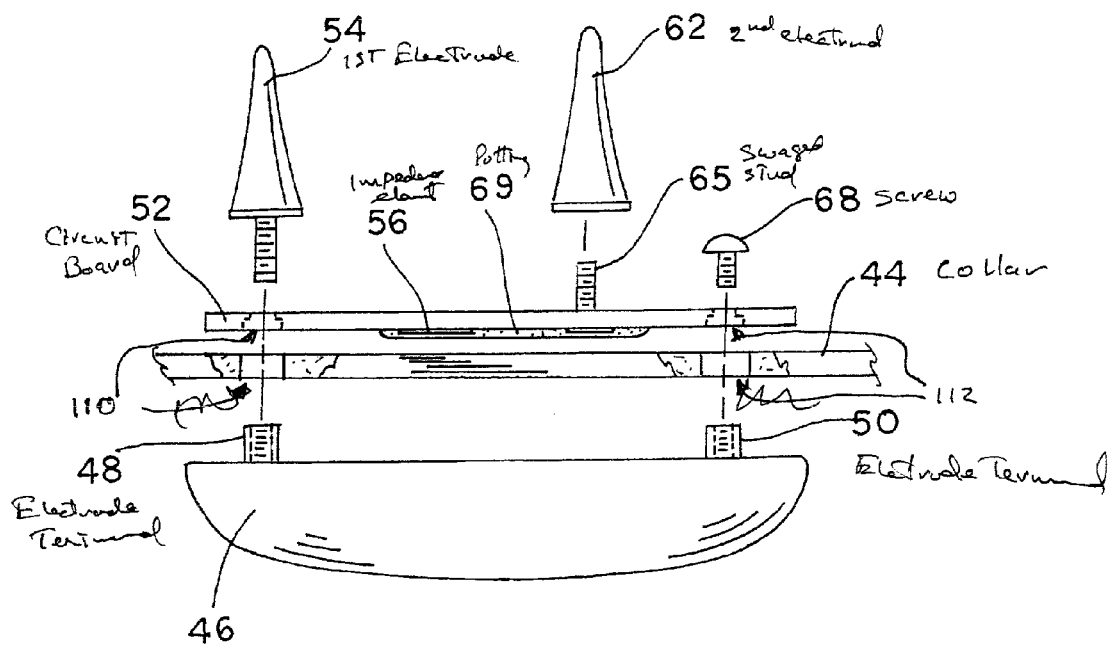
FIG. 5 is a partially fragmentary top view of the receiver of FIG. 2, including a circuit board according to the present invention.
Figure 6:
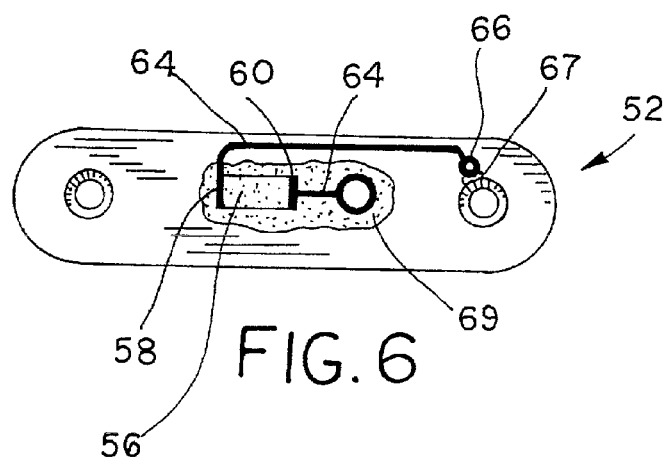
FIG. 6 is a front view of the circuit board of FIG. 5.

Referring now to the drawings, and more particularly to FIG. 1, there is shown a prior art training collar assembly 20 which generally includes a receiver 22, collar 24 and electrodes 26. Electrodes 26 are connected to receiver housing 28 at electrode terminals 30.

Receiver 22 can include a receiver antenna to receive a transmitted signal, where the antenna is connected to a demodulator which is connected to a receiver controller. Depending on the transmitted/received signal, the controller can actuate a electrical stimulus switch 32 which is connected to the controller, and which electrical stimulus switch 32 in turn energizes transformer 34 and electrodes 26. The controller can further be connected to, and can actuate a tone switch which is connected to and activates an enunciator; and/or a vibration switch which is connected to and activates a vibrational element.

In contrast, the present invention provides an animal training collar assembly 40 (see FIGS. 2 and 4-6), which includes a receiver 42 with collar 44, which has a receiver housing 46 including a first electrode terminal 48 and a second electrode terminal 50, each accessible from an outside of receiver housing 46. Receiver 42 is similar to receiver 22 previously described, but additionally includes a circuit board 52 connected to first electrode terminal 48 and second electrode terminal 50 on the outside of receiver housing 46. A first electrode 54 is directly electrically connected to first electrode terminal 48. An impedance element 56 is mounted on circuit board 52. Impedance element 56 has a first impedance terminal 58 and a second impedance terminal 60. First impedance terminal 58 is directly electrically connected to second electrode terminal 50. A second electrode 62 is directly electrically connected to second impedance terminal 60.

By using circuit board 52 with impedance element 56 between second electrode terminal 50 and second electrode 62, the stimulation levels can be adjusted as appropriate for the training circumstance. Impedance element 56 can be an electrical resistor, such as a surface mount resistor as shown. Resistor 56 can have a resistance value in a range of approximately between 10Ω (ohm) and 2 MΩ. More particularly, the resistance value can be 30Ω, 30 kΩ, 100 kΩ, 300 kΩ and 1 MΩ, and five separate circuit boards 52 can be provided each with a respective impedance element 56 with a respective resistance value. As training conditions or requirements change, a particular circuit board 52 can be selected and installed to receiver 42, with a respective value of resistance for impedance element 56. Each circuit board 52 includes a plurality of electrical traces 64, and/or a plated through hole (s) 66 electrically interconnecting impedance element 56, second impedance terminal 60 and second electrode 62. Plated through hole 66 connects to another electrical trace 67 on the opposite side of circuit board 52, and this trace is connected to second electrode terminal using screw 68. Adhesive material 69 protects impedance element and 56 and swaged stud 65. Alternatively, material 69 can be a potting material or other protective coating.

Figure 7:
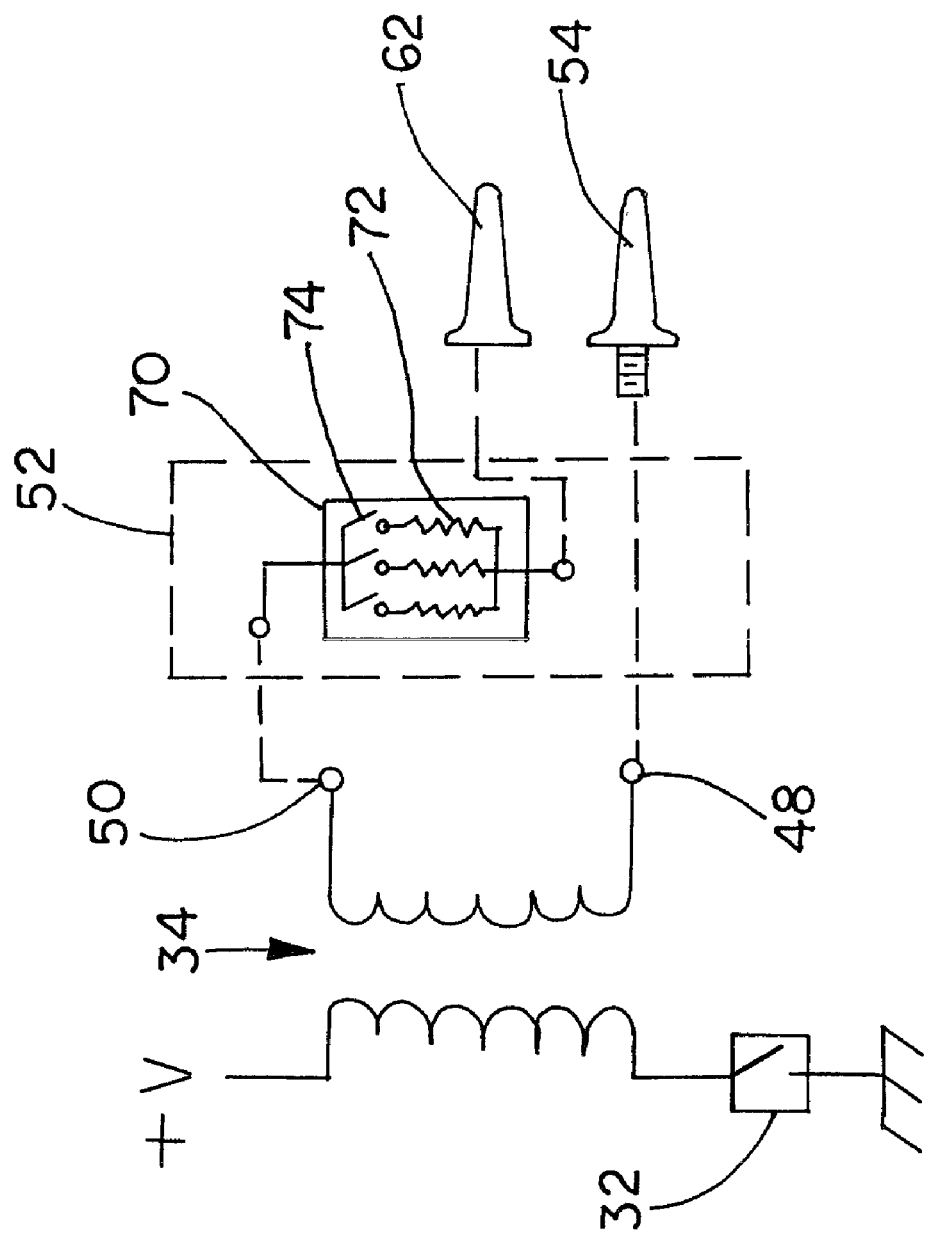
FIG. 7 is an electrical schematic view of another embodiment of a receiver according to the present invention.

Alternatively, impedance element 70 (FIG. 7) can include a plurality of resistors 72 which are switch 74 selectable individually, collectively and/or some combination thereof. Further, impedance elements 56 and/or 70 can have a complex value of impedance such as is the case of a series combined resistor and capacitor. Impedance elements 56 and/or 70 can include any series and/or parallel combination of resistors, capacitors and/or inductors. Impedance elements 56 and/or 70 can include variable elements such as a variable capacitor.

The present invention can be used in an animal training system 80 (FIG. 8), which includes transmitter 82 connected to a containment loop type antenna 84. Animal training system 80 is configured as a containment type animal training system. Transmitter 82 can include a controller connected to a modulator, which is connected to and sends signals to antenna 84. Receiver 42 on collar 44 worn by animal or dog 86, receives the wireless signal provided by antenna 84 and provides a correction to dog 86 when dog 86 is too near the electromagnetic boundary established by antenna 84 and transmitter 82.

The present invention can be used in an animal training system 90 (FIG. 9), which includes transmitter 92 connected to an avoidance type antenna 94. Animal training system 90 is configured as an avoidance type animal training system. Transmitter 92 can include a controller connected to a modulator, which is connected to and sends signals to antenna 94. Receiver 42 on collar 44 worn by animal or dog 96, receives the wireless signal provided by antenna 94 and provides a correction to dog 96 when dog 96 is too near the electromagnetic avoidance zone 98 established by antenna 94 and transmitter 92.

Figure 10:
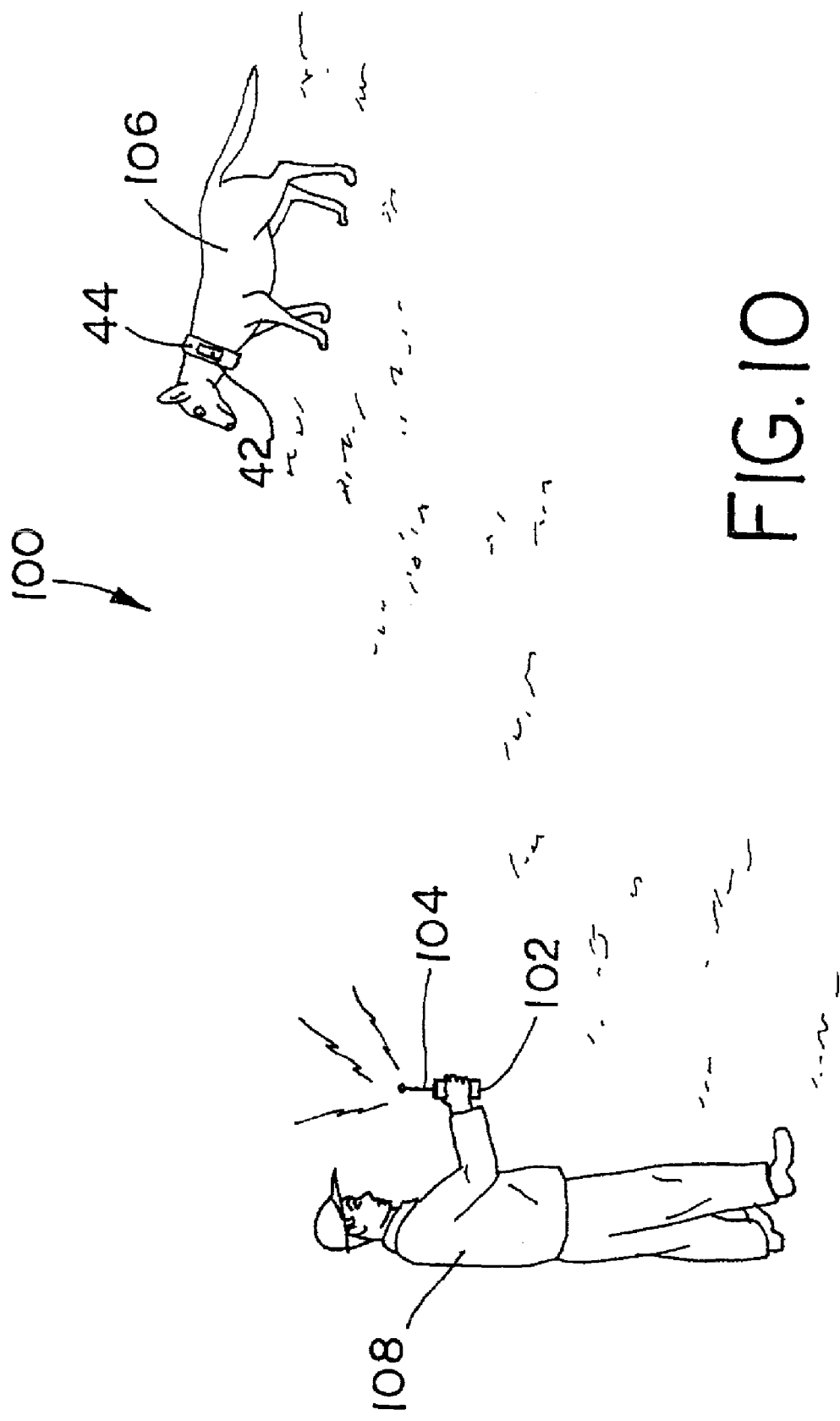
FIG. 10 is a schematic view of a remote training type animal training system according to the present invention.

The present invention can be used in an animal training system 100 (FIG. 10) which includes transmitter 102 connected to a remote training type antenna 104. Animal training system 100 is configured as a remote training type animal training system. Transmitter 102 can include a controller connected to a modulator which is connected to and sends signals to antenna 104. Receiver 42 on collar 44 worn by animal or dog 106, receives the wireless signal provided by antenna 104 and provides a correction to dog 106 as required by human trainer 108. Transmitter 102 can include a command input device, connected to the controller, and accessible to trainer 108, to facilitate training command input to transmitter 102 by trainer 108.

Additionally, receiver 42 can be included on a bark control collar.

In use, the present invention provides a method of providing different levels of stimulation in a receiver 42 for an animal training collar, comprising the steps of: providing a receiver 42 including a receiver housing 46 having a first electrode terminal 48 and a second electrode terminal 50 each accessible from an outside of receiver housing 46; selecting an impedance element 56, impedance element 56 having a first impedance terminal 58 and a second impedance terminal 60, first impedance terminal 58 directly connected to second electrode terminal 50; mounting impedance element 56 on a circuit board 52; and connecting circuit board 52 to first electrode terminal 48 and second electrode terminal 50 on the outside of receiver housing 46 and between a pair of electrodes 54, 62 and housing 46. The pair of electrodes 54, 62 can include a first electrode 54 and a second electrode 62, and the method can further include the step of directly electrically connecting first electrode 54 to first electrode terminal 48. Impedance element 56 can include a first impedance terminal 58 and a second impedance terminal 60, and the method can further include the step of directly electrically connecting second electrode 62 to second impedance terminal 60.

Figure 11:
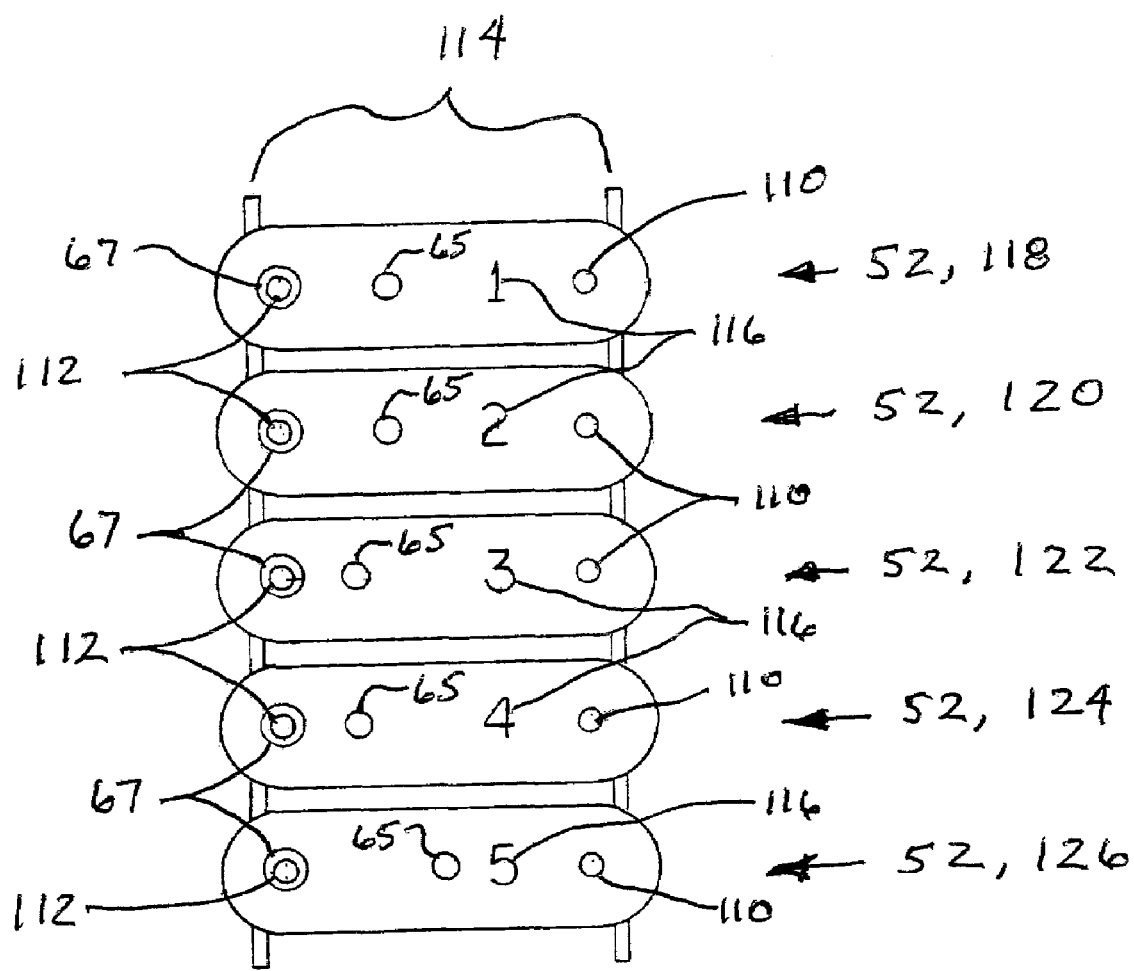
FIG. 11 is a view of a kit of circuit boards of the present invention.

Now, additionally referring to FIG. 11 there is shown a kit carrier 114, which carries numerous circuit boards 52. Circuit boards 52 are associated with kit carrier 114 and include a first circuit board 118, a second circuit board 120, a third circuit board 122, a fourth circuit board 124 and a fifth circuit board 126. Although five circuit boards 52 are illustrated, other quantities for kit 114 are also contemplated. Circuit boards 118 through 126 each include an identifier 116 to give a quick visual indication as to an electrical characteristic of a respective circuit board 52. Holes 110 and 112 extend through circuit board 52, thereby allowing first electrode 54 to mechanically secure circuit board 52 to electrode terminal 48. Screw 68 also known as an electrical connection 68 electrically connects electrical terminal 50 to electrical trace 67 of circuit board 52. This construct results in first electrode 54 mechanically securing circuit board 52 to receiver 42 and electrical connector 68 mechanically and electrically securing circuit board 52 to receiver 42. As can be seen in FIG. 11, the positioning of stud 65 can vary in its distance from hole 112. For example, circuit boards 118 and 120 locate stud 65 at one position and circuit boards 122 and 124 locate stud 65 in another location. Second electrode 62 is closer to first electrode 54 than electrode terminal 48 is to electrode terminal 50.

One of circuit boards 52 is selected from kit carrier 114 to be the selected circuit board 52, which is connected to receiver 42. The selection of one of circuit boards 52 is made based on a desired stimulation to the animal and is selected depending upon the identifying character 116 as it relates to the electrical characteristic of impedance element 56. Impedance element 56, which may be a resistor 56, alters the electrical energy delivered to electrodes 54 and 62 and thereby modifies animal training collar assembly 40. Indicators 116 may include an alphanumeric character, a color and/or a symbol that is associated with the different electrical characteristics of each circuit board 52. For example, circuit board 118 may have a resistor 56 having the highest resistive value with each succeeding circuit board 52 having a reduced resistance for resistor 56. Once a circuit board 52 is selected, it is then mechanically secured to first electrode terminal 48 and is mechanically and electrically connected to second electrode terminal 50.

Impedance element 56 absorbs and/or dissipates some of the energy that passes therethrough and is generally placed in series between second electrode terminal 50 and second electrode 62. The present inventive method provides for the selective modification of the location of electrodes and alters the energy delivered by the electrodes to the animal. The locating of the electrodes closer together and the reduction in the stimulation level can be desirable co-features when the present invention is used on small animals.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal behavior modification kit, comprising:
   a collar mountable receiver having a first electrode terminal and a second electrode terminal; and
   a plurality of circuit boards, each of said plurality of circuit boards being selectively mechanically connectable to both said first electrode terminal and said second electrode terminal, said plurality of circuit boards including at least one electrical component having an electrical characteristic, said electrical characteristic of each of said plurality of circuit boards being different.

2. The kit of claim 1, wherein one of said plurality of circuit boards is selected, defining a selected circuit board that is mechanically connected to both said first electrode terminal and said second electrode terminal, said selected circuit board includes an electrical component electrically connected to said second electrode terminal.

3. The kit of claim 2, wherein said selected circuit board is not electrically connected to said first electrode terminal.

4. The kit of claim 3, further comprising a first electrode and a second electrode, said first electrode being connected to said first electrode terminal, said electrical component being connected in series with said second electrode.

5. The kit of claim 4, wherein said first electrode is closer to said second electrode than said first electrode terminal is to said second electrode terminal.

6. The kit of claim 4, wherein said electrical component is a resistor.

7. The kit of claim 2, further comprising two electrodes including a first electrode and a second electrode, said selected circuit board including an opening and an electrode terminal, said first electrode terminal and said first electrode being electrically connected through said opening.

8. The kit of claim 7, wherein said electrode terminal of said circuit board is electrically connected to said second electrode.

9. The kit of claim 8, further comprising an electrical connector, said circuit board having an electrical connection, said electrical connector connecting said electrical connection to said second electrode terminal.

10. The kit of claim 9, wherein said circuit board includes a voltage reduction element connected between said electrical connection and said electrode terminal of said circuit board.

11. The kit of claim 10, wherein said first electrode is closer to said second electrode than said electrical connector is to said first electrode.

12. The kit of claim 10, wherein said voltage reduction element is a resistor.

13. The kit of claim 1, further comprising a collar, said receiver being positioned on one side of said collar and said circuit board being located on an opposite side of said collar.

\* \* \* \* \*